(12) United States Patent
Rosas-Maxemin et al.

(10) Patent No.: US 9,761,140 B2
(45) Date of Patent: Sep. 12, 2017

(54) VEHICLE DETECTION SYSTEMS AND METHODS OF OPERATION THEREOF

(71) Applicants: Pied Parker, Inc., Palo Alto, CA (US); Alston Strickland, Palo Alto, CA (US)

(72) Inventors: Gianni Rosas-Maxemin, Palo Alto, CA (US); Alston Strickland, Palo Alto, CA (US); Francisco B. Sandoval, III, Palo Alto, CA (US)

(73) Assignee: PIED PARKER, INC., Palo Alto, CA (US)

( * ) Notice: Subject to any disclaimer, the term of this patent is extended or adjusted under 35 U.S.C. 154(b) by 0 days.

(21) Appl. No.: 15/366,953

(22) Filed: Dec. 1, 2016

(65) Prior Publication Data

US 2017/0083025 A1    Mar. 23, 2017

Related U.S. Application Data

(63) Continuation of application No. PCT/US2016/032529, filed on May 13, 2016.
(Continued)

(51) Int. Cl.
*G08G 1/14* (2006.01)
*G07B 15/02* (2011.01)
(Continued)

(52) U.S. Cl.
CPC ......... *G08G 1/144* (2013.01); *G01C 21/3461* (2013.01); *G05D 1/0088* (2013.01); *G05D 1/0225* (2013.01); *G05D 1/0242* (2013.01); *G05D 1/0255* (2013.01); *G06Q 10/00* (2013.01); *G06Q 10/02* (2013.01); *G07B 15/00* (2013.01); *G07B 15/02* (2013.01); *G08G 1/146* (2013.01);
(Continued)

(58) Field of Classification Search
CPC .......... G08G 1/14–1/149; G08G 1/065; G06A 10/02
See application file for complete search history.

(56) References Cited

U.S. PATENT DOCUMENTS 8,965,621 B1    2/2015  Urmson et al.
9,120,485 B1    9/2015  Dolgov
(Continued)

OTHER PUBLICATIONS

ParkingSpotter.com, "List Your Parking Spot," Accessed Apr. 7, 2015, http://www.parkingspotter.com/parking-spot-owners.*
(Continued)

*Primary Examiner* — Spencer D Patton
(74) *Attorney, Agent, or Firm* — Kwan & Olynick LLP

(57) ABSTRACT

A parking management system and methods of operation are disclosed. In one variation, a computer-implemented method comprises receiving positional data concerning a listing location from a listing client device; establishing a radius boundary based on the positional data; filtering one or more databases using the radius boundary to determine an amount of parking spaces listed and the amount of parking spaces reserved within a preset time period; calculating a location-specific transaction rate using the amount of parking spaces listed, the amount of parking spaces reserved, and the preset time period; determining a recommended listing price based on the location-specific transaction rate; and transmitting the recommended listing price to the listing client device.

20 Claims, 9 Drawing Sheets

Related U.S. Application Data

(60) Provisional application No. 62/162,574, filed on May 15, 2015.

(51) Int. Cl.

| | | |
|---|---|---|
| *G06Q 10/00* | (2012.01) | |
| *G01C 21/34* | (2006.01) | |
| *G05D 1/00* | (2006.01) | |
| *G05D 1/02* | (2006.01) | |
| *G06Q 10/02* | (2012.01) | |
| *G07B 15/00* | (2011.01) | |
| *G06F 17/30* | (2006.01) | |

(52) U.S. Cl.
CPC ........... *G08G 1/149* (2013.01); *G05D 1/0285* (2013.01); *G06F 17/30241* (2013.01)

(56) References Cited

U.S. PATENT DOCUMENTS

| | | |
|---|---|---|
| 9,305,310 B2 | 4/2016 | Radhakrishnan et al. |
| 2011/0022427 A1 | 1/2011 | Dayan |
| 2012/0293013 A1* | 11/2012 | Parsons .............. H05B 37/0227 307/113 |
| 2012/0310712 A1* | 12/2012 | Baughman ............. G07B 15/02 705/13 |
| 2014/0085109 A1 | 3/2014 | Stefik et al. |
| 2015/0066545 A1* | 3/2015 | Kotecha ................. G06Q 10/02 705/5 |
| 2015/0124093 A1* | 5/2015 | Wang ................. G06K 9/00812 348/148 |
| 2016/0178376 A1* | 6/2016 | Moore ..................... G08G 1/14 701/532 |
| 2016/0209845 A1* | 7/2016 | Kojo .................. G01C 21/3407 |

OTHER PUBLICATIONS

International Search Report issued on PCT/US2016/032529 by the U.S. Search Authority (dated Aug. 16, 2016), pp. 1-2.
Written Opinion of the International Searching Authority issued on PCT/US2016/032529 by the U.S. Search Authority (dated Aug. 16, 2016), pp. 1-7.

\* cited by examiner

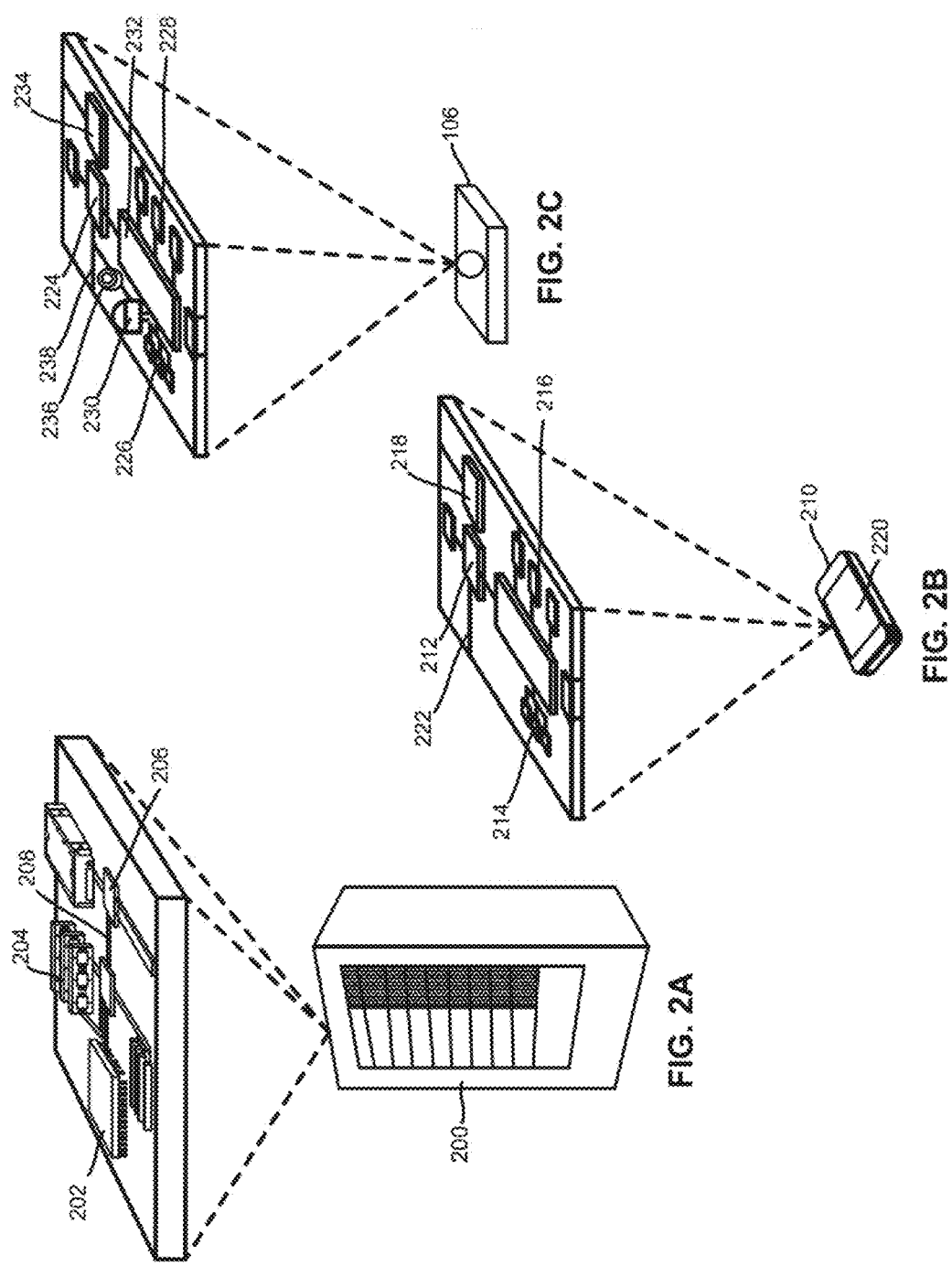

| # | USER ID | TYPE | LAT,LONG/ UTM/GPS | STATUS | REQUEST SOURCE | ••• | LIST TIME | LIST PRICE |
|---|---|---|---|---|---|---|---|---|
| 001 | 242345 | GRG | 37° 4' 31.3" N 122° 2' 38.3" W | RSVD | PARK SENSOR | ••• | '2016-05-09 13:14:07' UTC | $20/hr |
| 002 | 262345 | DWY | (24.2744, -100.405) | AVAIL | MOBILE DEVICE | ••• | '2016-05-09 14:11:05' UTC | $5/hr |
| 003 | 134516 | GRG | 19 N 553353.6m E, 423034.6m N | OCCP | PARK SENSOR | ••• | '2016-05-09 12:10:01' UTC | $20/hr |
| 004 | 538970 | DWY | (39.3344, -121.405) | AVAIL | PARK SENSOR | ••• | '2016-05-09 14:15:32' UTC | $18/hr |
| 005 | 346945 | DWY | 37° 4' 32.3" N 122° 2' 37.3" W | OCCP | MOBILE DEVICE | ••• | '2016-05-09 12:41:02' UTC | $16/hr |
| ••• | ••• | ••• | ••• | ••• | ••• | ••• | ••• | ••• |
| 999 | 369712 | GRG | (20.2744, -80.405) | AVAIL | PARK SENSOR | ••• | '2016-05-09 12:23:41' UTC | $12/hr |

⇩ FILTER

| # | USER ID | TYPE | LAT,LONG/ UTM/GPS | STATUS | REQUEST SOURCE | ••• | LIST TIME | LIST PRICE |
|---|---|---|---|---|---|---|---|---|
| 001 | 242345 | DWY | 37° 4' 31.3" N 122° 2' 38.3" W | RSVD | PARK SENSOR | ••• | '2016-05-09 13:14:07' UTC | $20/hr |
| 002 | 125467 | GRG | 37° 3' 30.3" N 122° 8' 31.3" W | RSVD | PARK SENSOR | ••• | '2016-05-09 13:10:21' UTC | $17/hr |
| 003 | 346945 | DWY | 37° 4' 31.3" N 122° 2' 38.3" W | OCCP | MOBILE DEVICE | ••• | '2016-05-09 12:41:02' UTC | $16/hr |

FIG. 6A

| # | USER ID | TYPE | LAT,LONG/ UTM/GPS | OCCUP. STATUS | RSV PERIOD | ••• | PARK TIME | BUFFER |
|---|---|---|---|---|---|---|---|---|
| 001 | 462311 | GRG | 33° 4' 31.3" N 102° 2' 38.3" W | EMPTY | 1 HR | ••• | IN: N/A OUT: N/A | 0.5 HR |
| 002 | 111567 | DWY | 37° 2' 24.3" N 122° 9' 30.3" W | EMPTY | 2 HR | ••• | IN: N/A OUT: N/A | 1 HR |
| 003 | 302942 | DWY | 37° 4' 31.3" N 122° 2' 38.3" W | OCCP | 1.5 HR | ••• | IN: '2016-05-09 12:55:08' UTC OUT: N/A | 0.75 HR |

FIG. 6B

```
Longitude: 37.794434
Latitude: -122.395243
Radius: 1 km
*Filter park_listings DB TABLE*
SELECT
FROM park_listings
WHERE (
POW( ( 69.1 * ( Longitude - 37.794434 ) * cos(-122.395243 / 57.3 ) ) , 2 ) + POW( ( 69.1 * ( Latitude - -122.395243 ) ) ,
2 )
) < ( 1 *1 );
WHEN (DATEADD (minute, -60, GETDATE()))
    ⋮
Recommend_Price = List_Mulipl * Avg_Price
    List_Multipl = IF Transct_Rate > Transct_Thrshd_1, THEN
    List_Multipl = LOG(Transct_Rate), ELSE
    Transct_Rate > Transct_Thrshd_2 THEN
        List_Multipl = LN(Transct_Rate), ELSE Transct_Rate = List_Multipl
    Transct_Rate = COUNT(Park_List, < 60 min AND < 1km radius) + COUNT(Park_Rsv, < 60 min
    AND < 1km radius) OR COUNT(Park_Rsv, < 60 min AND < 1km radius) / COUNT(Park_List)
    Avg_Price = SUM(List_Price, < 1 km radius)/COUNT(Park_List, 1 km radius)
    ⋮
Recommend_Prk_Window = Avg_Prk_Time
    Avg_Prk_Time = SUM(Prk_Time, < 10 hrs AND < 1km radius) / COUNT(Park_Rsv, < 10 hrs AND < 1km
    radius)
    ⋮
IF OnTimeDepart_Status = TRUE, THEN
    CurrentPosition = getCurrentPosition(USER_ID), IF CurrentPosition > 1km radius,
        var map = new google.maps.Map(document.getElementById('map'), {
            zoom: 25,
            mapTypeId: google.maps.MapTypeId.ROADMAP
        });
        var marker = null;
        function autoUpdate() {
            navigator.geolocation.getCurrentPosition(function(position) {
            var newPoint = new google.maps.LatLng(position.coords.latitude,
                            position.coords.longitude);
            if (marker) {
                marker.setPosition(newPoint);
            }
            else {
                marker = new google.maps.Marker({
                    position: newPoint,
                    map: map
                }); }
            map.setCenter(newPoint);
            });
            setTimeout(autoUpdate, 1000); } autoUpdate();
THEN
DISPLAY(Recommend_Penalty_Rate),
    Recommend_Penalty_Rate = Penalty_Multipl * Recommend_Price
    Penalty_Multipl = List_Multipl * LOG(Current_Time_sec – Exp_Rsvd_Time_sec)
```

FIG. 7

VEHICLE DETECTION SYSTEMS AND METHODS OF OPERATION THEREOF

CROSS-REFERENCE TO RELATED APPLICATIONS

The present application is a continuation of PCT application no. PCT/US16/32529, filed on May 13, 2016, which claims the benefit of U.S. Provisional Application No. 62/162,574, filed on May 15, 2015. The above-identified patent applications are hereby incorporated by reference in their entireties.

TECHNICAL FIELD

This disclosure relates generally to the field of vehicle parking management and, more specifically, to vehicle detection systems and methods of operation thereof.

BACKGROUND

Parking a vehicle in densely populated environments is often a frustrating experience due to the dearth of free parking spaces and the expense of private parking garages or lots. This is especially true in populated urban environments such as the downtowns of large municipalities (e.g., New York City, San Francisco, etc.). Moreover, parking is often in demand near destinations or event venues such as neighborhoods surrounding sports stadiums, concert halls, amusement parks, or beachfronts.

Additionally, the high price of real estate has motivated many property owners to seek out non-traditional ways for property owners to monetize their real property assets. For example, homeowners can often rent out rooms in their homes to tourists or travelers using an online home rental platform.

Therefore, a solution is needed for a parking management system to conveniently, securely and effectively allow property owners to rent out their available parking space(s) and for drivers seeking parking to reserve such parking spaces. In addition, such a solution should assist the property owner in determining an appropriate rental price for their parking spaces. Also, such a solution should be able to assist the property owner in maximizing their earning potential from such assets by ensuring adequate turnover in parked vehicles and that empty parking spaces are occupied quickly and efficiently. Moreover, such a solution should also ensure that drivers vacate rented parking spaces in time so as not to inconvenience property owners who require such spaces and suggest appropriate penalty measures when drivers overstay their allotted parking times.

SUMMARY

A parking management system and methods of operation are disclosed. A computer-implemented method of managing parking reservations over a communications network can include receiving, in one or more databases stored in one or more memory units, positional data concerning a listing location. The method can also include establishing, using one or more processors of a computing system, a radius boundary based on the positional data stored in the one or more databases and filtering, using the one or more processors, the one or more databases using the radius boundary to determine an amount of parking spaces listed and the amount of parking spaces reserved within a preset time period. The method can also include calculating, using the one or more processors, a transaction rate using the amount of parking spaces listed, the amount of parking spaces reserved, and the preset time period and storing the transaction rate in the one or more databases. The method can also include determining, using the one or more processors, a recommended listing price based on the transaction rate and transmitting, over the communications network using one or more communication interfaces, the recommended listing price to a listing client device.

The method can also include receiving, over the communications network, one or more listing requests from one or more parking sensors. The method can also include receiving, over the communications network, one or more reservation requests from at least one of one or more booking client devices and one or more control units of a self-driving vehicle and updating, using the one or more processors, the amount of parking spaces listed and the amount of parking spaces reserved in the one or more databases using the one or more listing requests and the one or more reservation requests.

The one or more parking sensors can include a proximity detector, one or more sensor processors, a sensor communication interface, and a portable power supply. The one or more parking sensors can also include a positioning unit of a booking client device or the control unit of a self-driving vehicle.

The method can also include adding, using the one or more processors, a buffer period to a reservation period in response to receiving the reservation request from at least one of the booking client device and the control unit of the self-driving vehicle. The method can also include calculating, using the one or more processors, an average listing price based on listing prices stored in the one or more databases prior to determining the recommended listing price and determining, using the one or more processors, the recommended list price by calculating a listing multiplier using the transaction rate stored in the one or more databases and multiplying the listing multiplier by the average listing price.

The method can also include calculating the listing multiplier by applying, using the one or more processors, a logarithmic function to the transaction rate stored in the one or more databases when the transaction rate exceeds a rate threshold. The method can also include receiving timestamp data from one or more sensors in a vicinity of the listing location and storing the timestamp data in the one or more databases. The method can also include determining, using the one or more processors, an average park time using the timestamp data; and transmitting, over the communications network using the one or more communication interfaces, a recommended availability time calculated using the average park time to the listing client device. The one or more sensors can include a positioning unit of at least one of one or more booking client devices and one or more control units of a self-driving vehicle.

The method can also include receiving, over the communications network, a status update from a booking client device concerning an upcoming departure of a vehicle occupying a reserved parking space. The method can also include determining a real-time position of the booking client device in response to receiving the status update and querying a parking sensor in a vicinity of the reserved parking space in response to the status update received from the booking client device to confirm an occupancy status of the reserved parking space.

The method can also include calculating a penalty multiplier using the transaction rate based on the occupancy status of the reserved parking, calculating a penalty rate using the penalty multiplier and a listing price, and transmitting, over the communications network, the penalty rate to at least one of the booking client device and the listing client device.

A computing system to manage parking reservations over a communications network can include one or more communication interfaces, one or more memory units, one or more processors executing computer-readable instructions stored in the one or more memory units to receive, in one or more databases stored in the one or more memory units, positional data concerning a listing location, establish a radius boundary based on the positional data stored in the one or more databases, and filter the one or more databases using the radius boundary to determine an amount of parking spaces listed and the amount of parking spaces reserved within a preset time period.

The computing system can also calculate a transaction rate using the amount of parking spaces listed, the amount of parking spaces reserved, and the preset time period and storing the transaction rate in the one or more databases, determine a recommended listing price based on the transaction rate, and transmit, over the communications network using the one or more communication interfaces, the recommended listing price to a listing client device.

A non-transitory computer readable medium can include computer executable instructions stored thereon executed by one or more processors, where the instructions include the steps of receiving, in one or more databases stored in one or more memory units, positional data concerning a listing location, establishing, using the one or more processors of a computing system, a radius boundary based on the positional data stored in the one or more databases, and filtering, using the one or more processors, the one or more databases using the radius boundary to determine an amount of parking spaces listed and the amount of parking spaces reserved within a preset time period. The instructions can also include the steps of calculating, using the one or more processors, a transaction rate using the amount of parking spaces listed, the amount of parking spaces reserved, and the preset time period and storing the transaction rate in the one or more databases, determining, using the one or more processors, a recommended listing price based on the transaction rate, and transmitting, over the communications network using one or more communication interfaces, the recommended listing price to a listing client device.

The methods, devices, or systems disclosed herein may be implemented in a variety of different ways. Certain variations have other steps or elements in addition to or in place of those mentioned above. The steps or elements will become apparent to those skilled in the art from the accompanying drawings or from the detailed description that follows.

BRIEF DESCRIPTION OF THE DRAWINGS

FIG. 2A illustrates a variation of a server of the parking management system.

FIG. 2B illustrates a variation of a client device of the parking management system.

FIG. 2C illustrates a variation of a parking sensor of the parking management system.

FIG. 6A illustrates a variation of a listing database table stored in one or more databases of the parking management system.

FIG. 6B illustrates a variation of a reservation database table stored in one or more databases of the parking management system.

FIG. 7 illustrates examples of computer readable instructions and application logic undertaken by the parking management system.

DETAILED DESCRIPTION OF THE INVENTION

Figure 1:
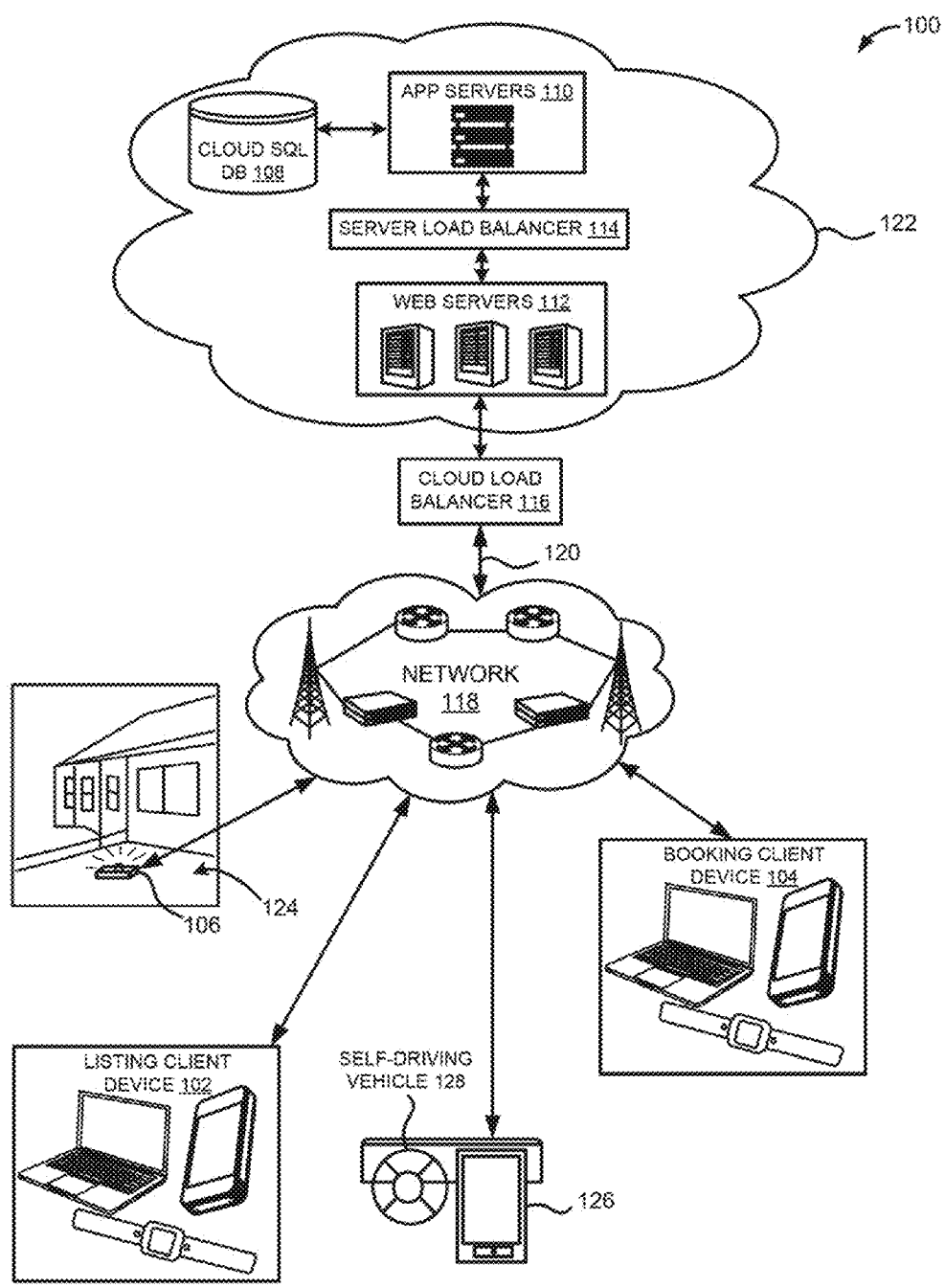
FIG. 1 illustrates a parking management system.

FIG. 1 illustrates that a parking management system 100 can include one or more listing client devices 102, booking client devices 104, parking sensors 106, or a combination thereof communicatively coupled to one or more databases 108, application servers 110, web servers 112, server load balancers 114, cloud load balancers 116, or a combination thereof over a communications network 118.

The communications network 118 can be any multi-hop network that covers regions, countries, continents, or a combination thereof. Examples of the communications network 118 can include a cellular network such as a 3G network, a 4G network, a long-term evolution (LTE) network; a sonic communication network; a satellite network; a wide area network such as the Internet, or a combination thereof. The web servers 112, the application servers 110, the server load balancers 114, the cloud load balancers 116, or a combination thereof can be communicatively coupled to the communications network 118 through connections 120. The connections 120 can be wired connections, wireless connections, or a combination thereof.

The parking management system 100, or a portion therein, can include a web and/or mobile application hosted by a computing cloud 122 such as a Windows Azure™ cloud, an Amazon Elastic Computer Cloud (Amazon EC2)™, a Google App Engine™, or a combination thereof. For example, the parking management system 100 can include a web and/or mobile application run on virtual machines hosted on the one or more application servers 110, web servers 112, or a combination thereof. In one variation, the computing cloud 122 can include the one or more application servers 110, web servers 112, databases 108, server load balancers 114, cloud load balancers, portions therein, or a combination thereof. The parking management system 100 can rely on processing and storage resources provided by the one or more application servers 110, web servers 112, databases 108, server load balancers 114, cloud load balancers 116, or a combination thereof.

The cloud load balancers 116 can provide traffic load balancing and distribute client requests among multiple web servers 112. The web servers 112 can include HTTP servers or rely on the computing cloud 122 to handle HTTP requests. The web servers 112 can also be instantiated and managed by the computing cloud 122.

The server load balancer 114 can balance interactions between the web servers 112 and the one or more application servers 110. The application servers 110 can handle application logic and interacts with the databases 108 to store data and application states. The web servers 112, the application servers 110, or a combination thereof can include rack mount servers, cluster servers, blade servers, main frames, dedicated desktops or laptops, or a combination thereof.

The databases 108 can be one or more SQL databases. The application servers 110 can interface with one or more SQL servers managing the SQL databases. The application data and application states can be stored in a cloud managed SQL database. In other variations, the database 108 can be a document-oriented database including a NoSQL database such as a MongoDB® database.

The application servers 110, the web servers 112, the cloud load balancers 116, the server load balancers 114, and the cloud SQL databases 108 can be any of the servers, load balancers, and databases discussed in U.S. Pat. No. 9,176,773, the content of which is hereby incorporated by reference in its entirety.

The listing client devices 102, the booking client devices 104, or a combination thereof can include a portable computing device such as a smartphone, a tablet, a laptop, a smartwatch, a personal entertainment device, or a combination thereof. In other variations, the listing client device 102, the booking client device 104, or a combination thereof can include a desktop computer. The listing client device 102 can be used by a user of the parking management system 100 to list a parking space for rental or lease by other users of the parking management system 100. The booking client device 104 can be used by a user of the parking management system 100 to book a parking space listed for rental or lease on the parking management system 100.

The parking management system 100 can also include one or more parking sensors 106. The parking sensors 106 can be located at a listing location 124. In one variation, the parking sensor 106 can include the sensing components shown in FIG. 2C. In other variations, the parking sensor 106 can refer to a client device such as the listing client device 102, the booking client device 104, or parts therein.

The parking management system 100 can be communicatively coupled to a control unit 126 of a self-driving vehicle 128. For example, the parking management system 100 can receive data or client requests from the control unit 126 of the self-driving vehicle 128. The self-driving vehicle 128 can include motor vehicles or vessels having an autonomous or semiautonomous driving mode. For example, the self-driving vehicle 128 can be vehicles disclosed or discussed in U.S. Pat. No. 9,120,485, U.S. Pat. No. 8,965,621, and U.S. Pat. No. 8,954,217, the contents of which are hereby incorporated by reference in their entireties.

FIG. 2A illustrates that a server 200 of the parking management system 100 can have one or more processors 202, a memory 204, and a communication interface 206. The processors 202 can be coupled to the memory 204 and the communication interface 206 through high-speed buses 208. The server 200 can represent any of the web servers 112, the application servers 110, or a combination thereof of FIG. 1.

The processors 202 can include one or more central processing units (CPUs), graphical processing units (GPUs), Application-Specific Integrated Circuits (ASICs), field-programmable gate arrays (FPGAs), or a combination thereof. The processors 202 can execute software or computer-readable instructions stored in the memory 204 to execute the methods or operations described herein. The processors 202 can be implemented in a number of different manners. For example, the processors 202 can include one or more embedded processors, processor cores, microprocessors, logic circuits, hardware finite state machines (FSMs), digital signal processors (DSPs), or a combination thereof. For example, the processors 202 can be 64-bit processors.

The memory 204 can store software, data, logs, or a combination thereof. The memory 204 can be an internal memory. Alternatively, the memory 204 can be an external memory, such as a memory residing on a storage node, a cloud server, or a storage server. The memory 204 can be a volatile memory or a non-volatile memory. For example, the memory 204 can be a nonvolatile storage such as non-volatile random access memory (NVRAM), Flash memory, disk storage, or a volatile storage such as static random access memory (SRAM). The memory 204 can be the main storage unit for the server 200.

The communication interface 206 can include one or more wired or wireless communication interfaces. For example, the communication interface 206 can be a network interface card of the server 200. The communication interface 206 can be a wireless modem or a wired modem. In one variation, the communication interface 206 can be a WiFi modem. In other variations, the communication interface 206 can be a 3G modem, a 4G modem, an LTE modem, a Bluetooth® component, a radio receiver, an antenna, or a combination thereof. The server 200 can connect to or communicatively couple with the communications network 118 using the communication interface 206. The server 200 can transmit or receive packets or messages using the communication interface 206.

FIG. 2B illustrates that a client device 210 of the parking management system 100 can have a client processor 212, a client memory 214, a client communication unit 216, a locational unit 218 having a global positioning system (GPS) receiver, and a display 220. The client processor 212 can be coupled to the client memory 214, the client communication unit 216, and the locational unit 218 through high-speed buses 222.

The client processor 212 can include one or more CPUs, GPUs, ASICs, FPGAs, or a combination thereof. The client processor 212 can execute software stored in the client memory 214 to execute the methods described herein. The client processor 212 can be implemented in a number of different manners. For example, the client processor 212 can be an embedded processor, a processor core, a microprocessor, a logic circuit, a hardware FSM, a DSP, or a combination thereof. As a more specific example the client processor 212 can be a 32-bit processor such as an ARM® processor.

The client memory 214 can store software, data, logs, or a combination thereof. In one variation, the client memory 214 can be an internal memory. In another variation, the client memory 214 can be an external storage unit. The client memory 214 can be a volatile memory or a non-volatile memory. For example, the client memory 214 can be a nonvolatile storage such as NVRAM, Flash memory, disk storage, or a volatile storage such as SRAM. The client memory 214 can be the main storage unit for the client device 210.

The client communication unit 216 can be a wired or wireless communication interface. For example, the client communication unit 216 can be a network interface card of the client device 210. The client communication unit 216 can be a wireless modem or a wired modem. In one variation, the client communication unit 216 can be a WiFi modem. In other variations, the client communication unit 216 can be a 3G modem, a 4G modem, an LTE modem, a Bluetooth® component, a radio receiver, an antenna, or a combination thereof. The client device 210 can connect to or communicatively couple with the communications network 118 using the client communication unit 216. The client device 210 can transmit or receive packets or messages using the client communication unit 216.

The locational unit 218 can include a GPS component such as the GPS receiver, an inertial unit, a magnetometer, a compass, or a combination thereof. The locational unit 218 can receive GPS signals from a GPS satellite. The inertial unit can be implemented as a multi-axis accelerometer including a three-axis accelerometer, a multi-axis gyroscope including a three-axis MEMS gyroscope, or a combination thereof.

The display 220 can be a touchscreen display such as a liquid crystal display (LCD), a thin film transistor (TFT) display, an organic light-emitting diode (OLED) display, or an active-matrix organic light-emitting diode (AMOLED) display. In certain variations, the display 220 can be a retina display, a haptic touchscreen, or a combination thereof. For example, when the client device 210 is a smartphone, the display 220 can be the touchscreen display of the smartphone.

The client device 210 can refer to any of the listing client device 102, the booking client device 104, or a combination thereof. For purposes of the present disclosure, the client processor 212 can refer to a processor of the listing client device 102, the booking client device 104, or a combination thereof. Moreover, the client memory 214 can refer to a memory of the listing client device 102, the booking client device 104, or a combination thereof. In addition, the client communication unit 216 can refer to a communication unit of the listing client device 102, the booking client device 104, or a combination thereof. Furthermore, the locational unit 218 can refer to a locational unit or GPS receiver of the listing client device 102, the booking client device 104, or a combination thereof. Additionally, the display 220 can refer to the display of the listing client device 102, the booking client device 104, or a combination thereof.

For example, the servers 200 and client devices 210 disclosed herein can include the type of computing systems and mobile computing devices disclosed or discussed in U.S. Pat. No. 9,305,310, the content of which is hereby incorporated by reference in its entirety.

FIG. 2C illustrates that the parking sensor 106 can include a sensor processor 224, a sensor memory 226, a sensor communication interface 228, a proximity detector 230, a portable power supply 232, or a combination thereof. In other variations, the parking sensor 106 can include a sensor locational unit 234 having a global positioning system (GPS) receiver, a camera unit 236, or a combination thereof. The sensor processor 224 can be coupled to the sensor memory 214, the sensor communication interface 228, the proximity detector 230, the portable power supply 232, or a combination thereof through high-speed buses 222.

The sensor processor 224 can include one or more CPUs, GPUs, ASICs, FPGAs, or a combination thereof. The sensor processor 224 can execute software stored in the sensor memory 226 to execute the methods or operations described herein. The sensor processor 224 can be implemented in a number of different manners. For example, the sensor processor 224 can include a processor core, a microprocessor, a logic circuit, a DSP, or a combination thereof. As a more specific example the sensor processor 224 can include a 16-bit or 32-bit processor such as an ARM™ processor.

The sensor memory 226 can store software, data, logs, or a combination thereof. In one variation, the sensor memory 226 can be an internal memory. In another variation, the sensor memory 226 can be an external storage unit. The sensor memory 226 can be a volatile memory or a non-volatile memory. For example, the sensor memory 226 can be a nonvolatile storage such as NVRAM, Flash memory, disk storage, or a volatile storage such as SRAM.

The sensor communication interface 228 can be a wired or wireless communication interface. For example, the sensor communication interface 228 can be a network interface card of the parking sensor 106. The sensor communication interface 228 can be a wireless modem or a wired modem. In one variation, the sensor communication interface 228 can be a WiFi modem. In other variations, the sensor communication interface 228 can be a 3G modem, a 4G modem, an LTE modem, a Bluetooth® component, a radio receiver, an antenna, or a combination thereof. The parking sensor 106 can connect to or communicatively couple with the communications network 118 using the sensor communication interface 228. The parking sensor 106 can transmit or receive information or messages in the form of data packets using the sensor communication interface 228.

The proximity detector 230 can include an infrared (IR) light transceiver, an IR distance sensor, an ultrasonic transmitter and detector, or a combination thereof. The parking sensor 106 can use the proximity detector 230 to detect the presence of a vehicle in a certain vicinity of the parking sensor 106. For example, the parking sensor 106 can detect that a vehicle is near the parking sensor 106 when a portion of the vehicle, such as the chassis of the vehicle, covers or obscures the proximity detector 230 or a portion therein. In another variation, the parking sensor 106 can detect the presence of a vehicle when a part of the vehicle affects or interferes with a behavior of light or acoustic waves emitted, reflected, or received by the parking sensor 106.

The sensor locational unit 234 can include a GPS component such as a GPS receiver, an inertial unit, a magnetometer, a compass, or a combination thereof. The sensor locational unit 234 can receive GPS signals from a GPS satellite. The inertial unit can be implemented as a multi-axis accelerometer including a three-axis accelerometer, a multi-axis gyroscope including a three-axis MEMS gyroscope, or a combination thereof. The parking sensor 106 can also include a camera unit 236. The camera unit 236 can capture static images, video images, or a combination thereof and store the images in the sensor memory 226.

The sensor processor 224 can be coupled to the sensor memory 226, the sensor communication interface 228, the sensor locational unit 234, the proximity detector 230, and the camera unit 236 through high-speed buses 238.

Figure 3A:
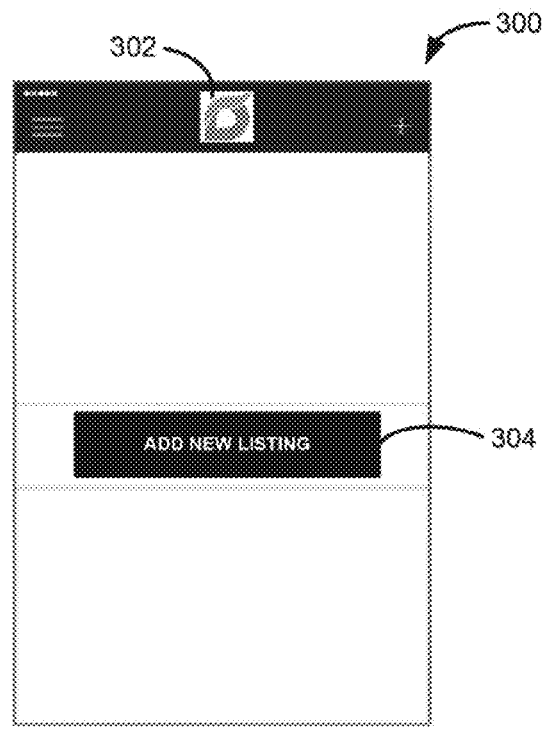
FIG. 3A illustrates a new listing graphical user interface (GUI) displayed on a listing client device connected to the parking management system.

FIG. 3A illustrates that a listing user of the parking management system 100 can list a parking space for rent or lease by applying a user input to a new listing graphical user interface (GUI) 300 displayed on a listing client device 102. The listing user can list the parking space by applying a user input to a button or link displayed as part of the new listing GUI 300. The listing user can transmit a listing request 304 to the application servers 110 in response to applying the user input to the button or link.

The listing request 304 can be transmitted as one or more communication packets, such as transmission control protocol (TCP) packets, containing a header and a payload. The listing request 304 can be received by the web servers 112, the application servers 110, or a combination thereof and stored in the database 108.

The new listing GUI 300 can be rendered through an application 302. In one variation, the application 302 can be written using the Xcode™ programming language, the Swift™ programming language, or a combination thereof. In other variations, the application 302 can be written using the Java™ programming language, the Objective-C programming language, or a C programming language.

Figure 3B:
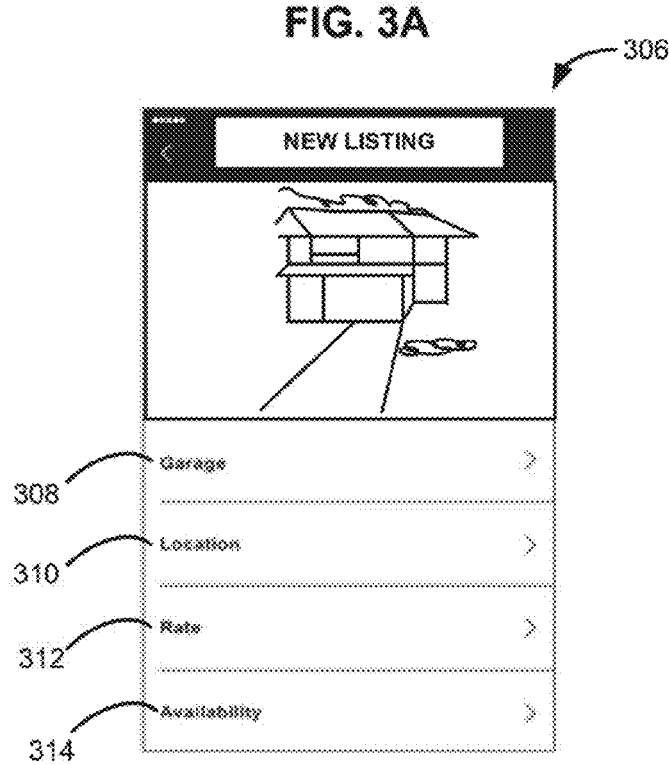
FIG. 3B illustrates a listing information GUI displayed on a listing client device connected to the parking management system.

FIG. 3B illustrates that the listing user can input information concerning the parking space through a listing information GUI 306. The listing user can enter a type 308 of parking space, a listing location 310, a listing price 312, an availability window 314, or a combination thereof. The type 308 of parking space can include a driveway space, a parking space in a residential or commercial garage, a parking space in a parking lot, a front yard or back yard space, a curb space, a metered space, or a combination thereof.

The listing location 310 can include an address of a residence, building, or other location providing the parking space. The listing user can manually enter a geographic address for the listing location 310 through the listing information GUI 306. In this case, the application server 110 can transmit the geographic address to a map database, such as a Geographic Information System (GIS) database or a Google Maps® database and query the map database for positional coordinates corresponding to the geographic address. The application server 110 can then store the positional coordinates in the database 108. In another variation, the user can use the locational unit 218 of the listing client device 102 to provide positional coordinates for the listing location 310 when the user is at the listing location 310.

The listing price 312 can include an hourly rate or price requested by the user for the parking space. The availability window 314 can be a time window when the parking space is available for rent or lease. For example, the availability window 314 can range from 30 minutes to 30 days. The listing request 304 can include data concerning the type 308 of parking space, the listing location 310, the listing price 312, the availability window 314, or a combination thereof.

In other variations, the listing request 304 can be transmitted directly from the parking sensor 106. The parking sensor 106 can automatically transmit the listing request 304 to the application servers 110 when the parking sensor 106 detects a vehicle has departed a parking space in the vicinity of the parking sensor 106. For example, the parking sensor 106 can be configured to store information concerning the listing location 310, the listing price 312, the availability window 314, and the type 308 of listing in the sensor memory 226. The parking sensor 106 can automatically transmit a listing request 304 containing such data or information as soon as the space is vacant. As a more specific example, the parking sensor 106 can be a sensor embedded in a driveway of a residence and the parking sensor 106 can transmit the listing request 304 as soon as a vehicle previously occupying the driveway vacates the driveway.

Figure 4A:
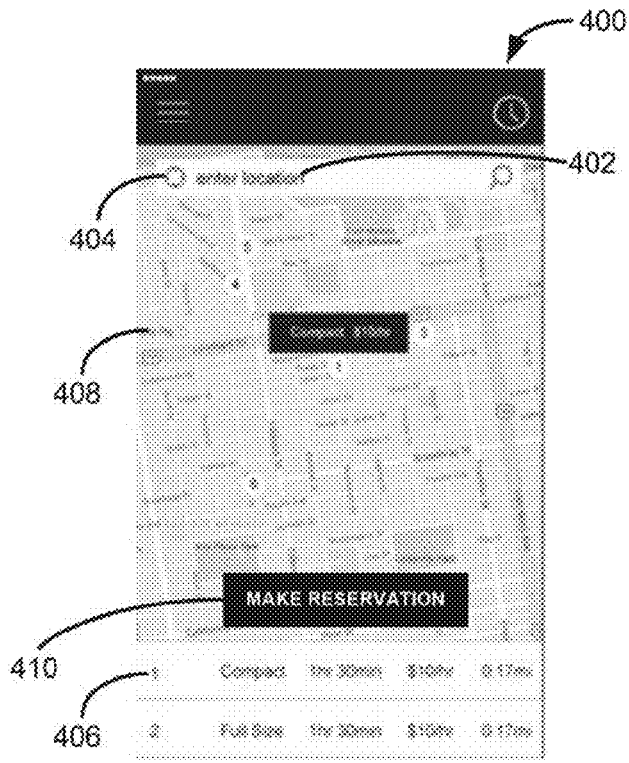
FIG. 4A illustrates a reservation request GUI displayed on a booking client device connected to the parking management system.

FIG. 4A illustrates that a booking user of the parking management system 100 can reserve a parking space listed by a listing user through a reservation request GUI 400. The booking user can reserve a parking space in a desired booking location 402 by manually entering a geographic address. In addition, the booking user can apply an input to a current location icon 404 displayed on the reservation request GUI 400 to prompt the locational unit 218 of the booking client device 104 to transmit the current geographic coordinates of the booking client device 104 to the application servers 110, the cloud-managed database 108, or a combination thereof. Moreover, the booking user can draw a radius boundary around a portion of a map graphic 408 displayed on the reservation request GUI 400.

The reservation request GUI 400 can display parking space listings 406 in list form or overlaid on the map graphic 408. Each space listings 406 can include information concerning the listing location 310, the listing price 312, or the availability window 314 associated with the space listing 406. Once the booking user has found a desired parking space, the booking user can select the space listing 406 to place a reservation request 410. For example, the booking user can apply a user input to an icon associated with the space listing 406 and then press a reservation button to place the reservation request 410.

Figure 4B:
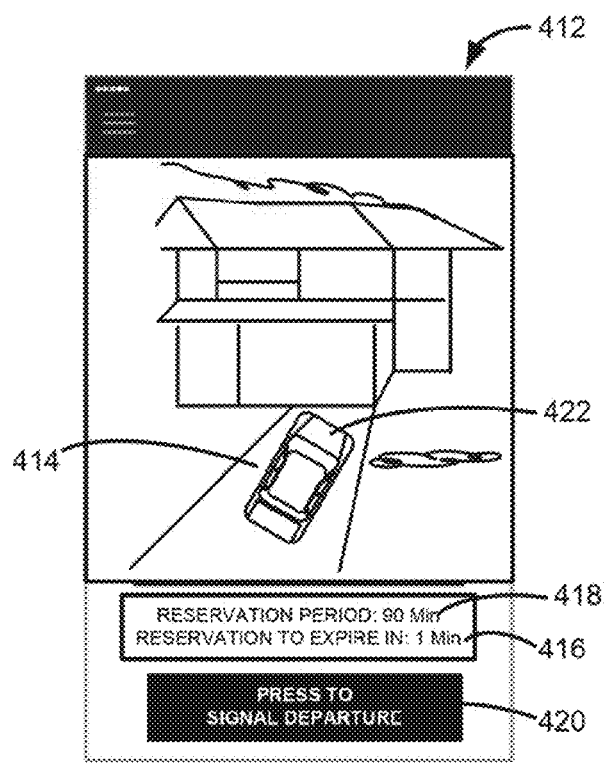
FIG. 4B illustrates a reservation status GUI displayed on a booking client device connected to the parking management system.

FIG. 4B illustrates that the booking user can view a current status of a reserved parking space 414 once a reservation has been placed using the parking management system 100. The booking user can view the current status of the reservation through a reservation status GUI 412. The reservation status GUI 412 can include a timer 416 counting down a reservation period 418. In other variations, the reservation status GUI 412 can display an accrued cost of the reservation. The booking user can apply a user input to a departure button to transmit a status update 420 to the parking management system 100 that a booking vehicle 422 is either in the process of departing the reserved parking space 414 or has departed the reserved parking space 414.

In another variation, the booking client device 104 can receive one or more messages or notifications from the parking management system 100 concerning the expiration of the reservation period 418. For example, the messages can include a text messages, such as a Short Message Service (SMS) message, a Multimedia Messaging Service (MMS) message, or a combination thereof. The messages can include a link to prompt the booking client device 104 to open the application 302 and display the reservation status GUI 412. The link can be a deep linking uniform resource locator (URL) address directing the booking client device 104 to open a specific page of the application 302.

In other variations, the booking vehicle 422 can be a self-driving vehicle 128 and the control unit 126 of the self-driving vehicle 128 can automatically transmit the reservation request 410 without input from the booking user. The reservation request 410 can include preset information or data concerning the parking space desired by an occupant or owner of the self-driving vehicle 128 including a listing location 310, the listing price 312, the type 308 of listing, or a combination thereof. The parking management system 100 can receive the reservation request 410 directly from the control unit 126 of the self-driving vehicle 128 and parse the reservation request 410 for data or information concerning the listing location 310, the listing price 312, the type 308 of listing, or a combination thereof. The parking management system 100 can then filter the one or more databases 108 to select a listing 406 matching the criteria included in the reservation request 410.

The parking management system 100 can also receive the status update 420 directly from the control unit 126 of the self-driving vehicle 128 without input from the booking user. The status update 420 can indicate that the self-driving vehicle 128 is departing or has departed the reserved parking space 414.

The listing client device 102, the booking client device 104, the parking sensors 106, or a combination thereof can encrypt requests, including a listing request 304 or a reservation request 410, before transmitting the request. The listing client device 102, the booking client device 104, the parking sensors 106, or a combination thereof can encrypt the requests using an encryption protocol such as a secure hash algorithm (SHA). The encryption protocol can be a SHA-256 hash function, a SHA-384 hash function, or any type of SHA-2 certificate or function. The listing client device 102, the booking client device 104, the parking sensors 106, or a combination thereof can securely transmit the encrypted request over the communications network 118 to servers or other devices in the computing cloud 122.

Figure 5:
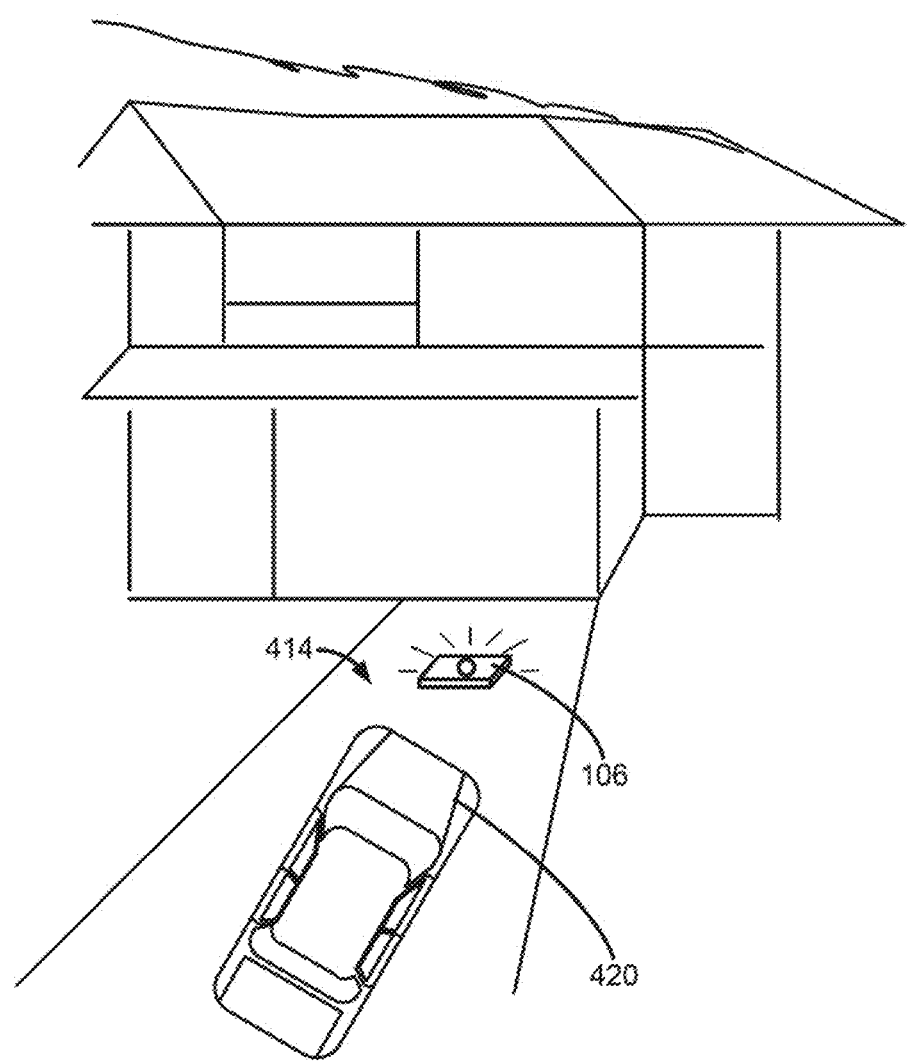
FIG. 5 illustrates a schematic of a booking vehicle detected by a parking sensor at a listing location.

FIG. 5 illustrates that the parking management system 100 can query a parking sensor 106 in a vicinity of the reserved parking space 414 in response to the status update 420 received from the booking client device 104 to confirm an occupancy status of the booking vehicle 422. For example, the application server 110 can ping the parking sensor 106 and request the last proximity measurement from the sensor memory 226. The application server 100 can also ping the parking sensor 106 to activate the proximity detector 230 of the parking sensor 106 and query the parking sensor 106 for a real-time proximity measurement.

In another variation, the parking management system 100 can activate the camera unit 236 of the parking sensor 106 and instruct the camera unit 236 to capture images of the environment surrounding the reserved parking space 414. The parking sensor 106 can then transmit the images to the one or more application servers 110 for analysis by an image recognition protocol executed by the one or more processors 202.

In variations where the parking sensor 106 refers to a listing client device 102 or portions therein, the application servers 110 can transmit one or more messages to the listing client device 102 to confirm that the booking vehicle 422 has departed the reserved parking space 414.

FIG. 6A illustrates that the database 108 can store in one or more database tables 600 positional data 602 concerning a listing location 310. The one or more databases 108 can include a cloud managed SQL database such as Microsoft Azure® database. The one or more databases 108 can be stored in a memory 204 of the computing cloud 122.

One or more servers responsible for managing the database 108 can receive the positional data 602 from a map database, such as a Google Maps® database, after querying the map database with a geographic address received from the booking client device 104. In other variations, the web servers 112, the application servers 110, or a combination thereof can receive the positional data 602 directly from the locational unit 218 of the booking client device 104.

The positional data 602 can include latitudinal and longitudinal coordinates. For example, the positional data 602 can include latitude and longitude coordinates in the Universal Traverse Mercator (UTM) coordinate system.

The database 108 can store the positional data 602 concerning the listing location 310 in one or more listing database tables 604. The application servers 110 can also parse the listing request 304 received from the booking client device 104, the control unit 126 of the self-driving vehicle 128, or a combination thereof and store data or information concerning the type 308 of parking space, the listing price 312, the availability window 314, or a combination thereof in the listing database tables 604.

FIG. 6B illustrates that the database 108 can also include one or more reservation database tables 606. The reservation database tables 606 can include data or information obtained from the reservation request 410 including the type 308 of parking space, the reservation period 418, positional data 602 concerning the reserved parking space 414, or a combination thereof. The reservation database tables 606 can also include data or information concerning an occupancy status 608 of the reserved parking space 414, a buffer period 610, and/or an actual parking time 614 based on timestamps 612 received from the listing client device 102 or the parking sensors 106.

The parking management system 100 can determine the occupancy status 608 of a reserved parking space 414 by querying or pinging one or more parking sensors 106 in a vicinity of the reserved parking space 414. In another variation, the parking management system 100 can determine the occupancy status 608 of a reserved parking space 414 by receiving a confirmation signal or message from a listing client device 102. For example, the parking management system 100 can transmit a text message to the listing client device 102 containing a link directing the listing user to confirm that a booking vehicle 422 has vacated the reserved parking space 414.

The parking management system 100 can also add a buffer period 610 to the reservation period 418 of a reservation request 410 stored in the reservation database tables 606. The parking management system 100 can set the buffer period 610 based on the length of the reservation period 418. For example, the parking management system 100 can set the buffer period 610 as half the length of the reservation period 418 initially requested by a booking user. In another variation, the parking management system 100 can automatically set a buffer period 610 of one hour for all reservations exceeding 30 minutes.

The parking management system 100 can permit the booking user to extend the reservation period 418 up to the end of the buffer period 610. For example, when a booking user initially requests a reservation period 418 of one hour, the parking management system 100 can automatically set the buffer period 610 for this reservation as 30 minutes. In this case, the parking management system 100 can allow the booking user to park the user's vehicle in the reserved parking space 414 for up to 1.5 hours. The parking management system 100 can charge the booking user an additional fee for the extension. Upon reaching the end of the buffer period 610, the parking management system 100 can prevent the booking user from extending the reservation period 418 any longer and require the booking user to initiate a new reservation request 410.

When a buffer period 610 is added to a reservation period 418, the parking management system 100 can ensure the listing 406 does not appear as an entry in any database tables listing available or unoccupied parking spaces during the pendency of the reservation period 418 and the buffer period 610. The parking management system 100 can add a buffer period 610 to all reservation requests 410 received from booking client devices 104 and/or the control units 126 of all self-driving vehicles 128.

The databases 108 can also store timestamps 612 received from listing client devices 102, booking client devices 104, parking sensors 106, or a combination thereof. The listing client devices 102, the parking sensors 106, or a combination thereof can transmit timestamps 612 in connection with the transmission of listing requests 304. The booking client devices 104 can transmit timestamps 612 in connection with the transmission of reservation requests 410. The parking sensors 106, the listing client devices 102, or a combination thereof can also transmit timestamps 612 in connection with the transmission of status updates 420 or when the occupancy status 608 of a reserved parking space 414 changes.

The reservation database table 606 can also store actual parking times 614 based on the timestamps 612 received. The parking management system 100 can determine the actual parking times 614 based on timestamps 612 received when a booking vehicle 422 occupies the reserved parking space 414 and the same booking vehicle 422 vacates the reserved parking space 414. The actual parking times 614 can differ from the reservation periods 418 included in the reservation requests 410.

The database tables 600 can also keep track of a listing count 616 and a reservation count 618. The listing count 616 can correspond to the number or amount of parking spaces listed using the parking management system 100 during a given time period. The reservation count 618 can correspond to the number or amount of parking spaces reserved using the parking management system 100 during a given time period. For example, the listing count 616 can correspond to the number of listing requests 304 received by the parking management system 100 within a given time period. The reservation count 618 can correspond to the number of reservation requests 410 received by the parking management system 100 within a given time period. The parking management system 100 can continuously update the one or more database tables 600, including the listing count 616 and the reservation count 618, based on the number of listing requests 304 and the number of reservation requests 410 received.

FIG. 7 illustrates that one or more processors 202 of the parking management system 100 can execute computer-readable instructions stored in a memory 204 of the computing cloud 122 in order to determine a recommended list price 700. The parking management system 100 can determine the recommended list price 700 in response to a listing request 304 received from a listing client device 102.

The parking management system 100 can determine the recommended list price 700 by first establishing a radius boundary 702 based on the positional data 602 received from the listing client device 102. The parking management system 100 can retrieve the positional data 602 stored in the one or more databases 108 and establish the radius boundary 702 using the coordinates of the position data 602 as the center point. For example, the parking management system 100 can establish the radius boundary 702 as the boundary or demarcation of a one mile or one kilometer radius. The parking management system 100 can set the size of the radius boundary 702 based on a geographic criterion such as a size of the municipality or geographic region in which the positional data 602 is located. The parking management system 100 can also adjust the radius boundary 702 based on a time-of-day, a day-of-the-week, a month, a season, or a combination thereof.

The parking management system 100 can then filter the one or more databases 108 using the radius boundary 702 and a preset time period 704. The preset time period 704 can range from 10 minutes to 10 days. In other variations, the preset time period 704 can be more than 10 days. The preset time period 704 can be adjusted by an administrator of the parking management system 100. The parking management system 100 can filter the one or more listing database tables 604 using the radius boundary 702 and the positional data 602 of all other listing requests 304 received within the preset time period 704 to determine the listing count 616. The parking management system 100 can also filter the one or more reservation database tables 606 using the radius boundary 702 and the positional data 602 of all reservation requests 410 received within the preset time period 704 to determine the reservation count 618.

The parking management system 100 can then calculate a transaction rate 706 using the listing count 616 and the reservation count 618. The transaction rate 706 can be calculated by summing the listing count 616 and the reservation count 618. The transaction rate 706 can be calculated by summing the listing count 616 and the reservation count 618 to yield a total count and then dividing the total count by the preset time period 704. The transaction rate 706 can also be equivalent to either the reservation count 618 or the listing count 616. The parking management system 100 can store the transaction rate 706 in one or more database tables 600 and update the transaction rate 706 as new listing requests 304 are received.

The transaction rate 706 can also be calculated by taking a ratio of the reservation count 618 and the listing count 616 and or by dividing the reservation count 618 by the listing count 616. The parking management system 100 can also calculate the transaction rate 706 by adding the ratio of the reservation count 618 and the listing count 616 to any of the listing count 616, the reservation count 618, or a sum thereof.

The parking management system 100 can then calculate a listing multiplier 708 using the transaction rate 706. The parking management system 100 can calculate the listing multiplier 708 by applying a first logarithmic function 710 to the transaction rate 706 when the transaction rate 706 exceeds a first rate threshold 712. For example, the first rate threshold 712 can be a rate of 10 listings and/or requests per minute and the parking management system 100 can apply a $\log_{10}$ function to the transaction rate 706 when the transaction rate 706 exceeds the first rate threshold 712. When the transaction rate 706 does not exceed the first rate threshold 712, the parking management system 100 can apply a second logarithmic function 714 to the transaction rate 706 when the transaction rate 706 exceeds a second rate threshold 716. The first rate threshold 712 can be different from the second rate threshold 716. For example, the first rate threshold 712 can be greater than the second rate threshold 716. The second logarithmic function 714 can be a natural log function.

The parking management system 100 can determine the recommended listing price 700 by multiplying the listing multiplier 708 by an average listing price 718. The parking management system 100 can calculate the average listing price 718 by taking an average of the listing prices 312 stored in the filtered instance of the listing database tables 604. After calculating the recommended listing price 700, the application servers 110 can transmit the recommended listing price 700 to the listing client device 102 over the communications network 118.

The parking management system 100 can also determine an average park time 720 based on the actual parking times 614 stored in the filtered instance of the reservation database table 606. The parking management system 100 can then transmit a recommended availability time 724 to the listing client device 102 equivalent to the average park time 720. In other variations, the parking management system 100 can multiply the average park time 720 by a multiplier to yield the recommended availability time 724.

The parking management system 100 can also ensure a booking user does not abuse the system by occupying a reserved parking space 414 past the end of the reservation period 418. The parking management system 100 can receive, over the communications network 118, a status update 420 concerning a departure or upcoming departure of a booking vehicle 422 from a reserved parking space 414.

The parking management system 100 can determine a real-time position of the booking client device 104 associated with the booking vehicle 422 in response to receiving the status update 420. The parking management system 100 can determine a real-time position 724 of the booking client device 104 by querying a map database such as a Google Maps® database. In another variation, the parking management system 100 can determine a real-time position 724 of the booking client device 104 by directly tracking a locational unit 218 of the booking client device 104.

When the real-time position 724 of the booking client device 104 is not in a vicinity of the listing location 310 of the reserved parking space 414, such as when the booking client device 104 is outside the radius boundary 702, the parking management system 100 can query the parking sensor 106 in the vicinity of the reserved parking space 414 to confirm the occupancy status 608 of the reserved parking space 414. In another variation, the parking management system 100 can query the listing client device 102 to confirm the occupancy status 608 of the reserved parking space 414 by requesting the listing user enter a user input to confirm the departure of the booking vehicle 422. In other variations, when the booking vehicle 422 is a self-driving vehicle 128, the parking management system 100 can ping the control unit 126 of the self-driving vehicle 128 for a real-time position of the self-driving vehicle 128.

The parking management system 100 can calculate a penalty rate 726 using a penalty multiplier 728. In one variation, the penalty multiplier 728 can be equivalent to the listing multiplier 708. In other variations, the penalty multiplier 728 can be greater than the listing multiplier 708, such as double the value of the listing multiplier 708. The parking management system 100 can calculate the penalty rate 726 by multiplying the listing price 312 by the penalty multiplier 728. The parking management system 100 can transmit, over the communications network 118, the penalty rate 726 to the booking client device 104, the listing client device 102, or a combination thereof.

Figure 8:
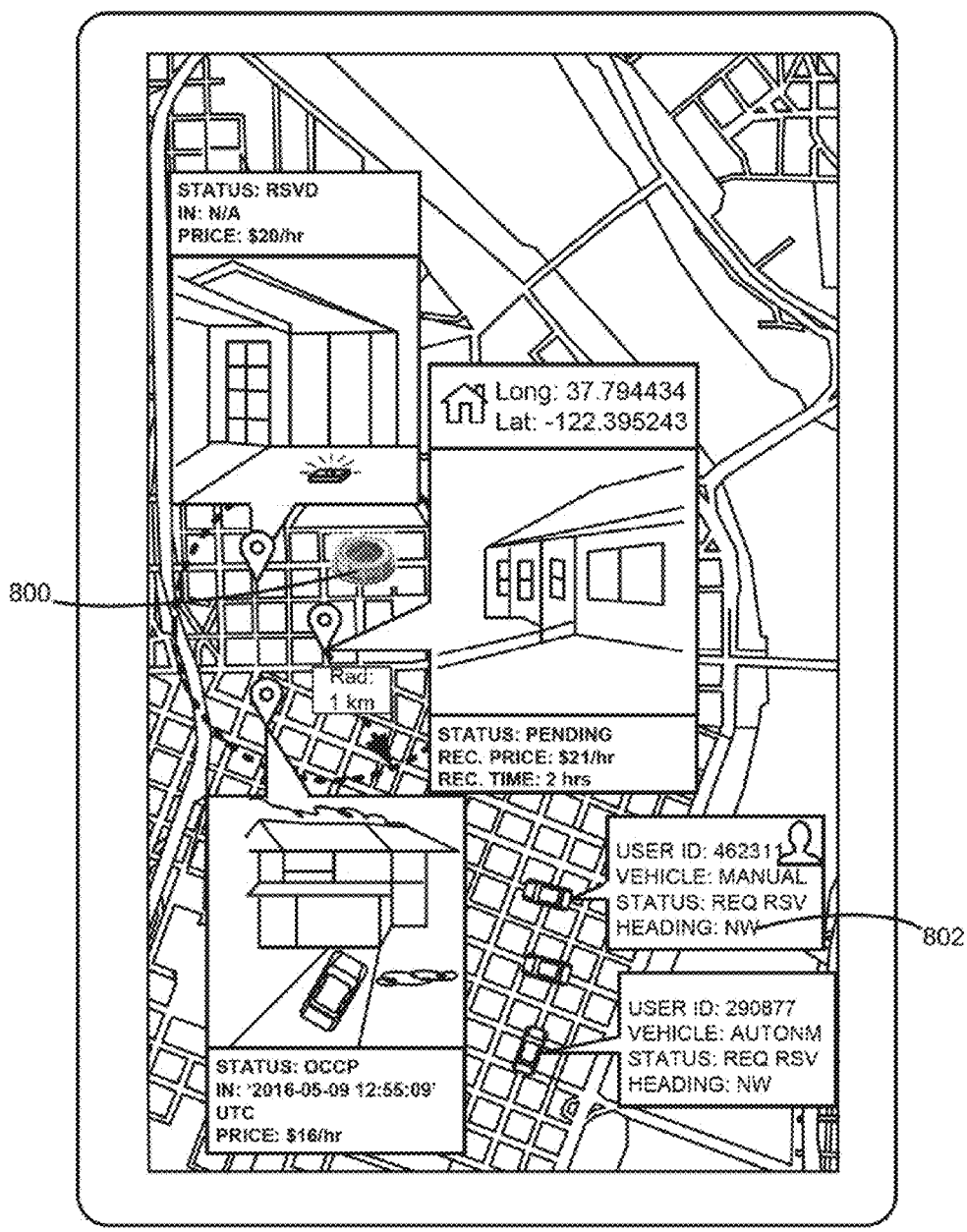
FIG. 8 illustrates a variation of a map overview GUI displayed on a display component connected to the parking management system.

FIG. 8 illustrates that the parking management system 100 can determine a causal point-of-interest (POI) 800 using the transaction rate 706 and positional data 602 included in the listing requests 304 and reservation requests 410 received by the parking management system 100 within a preset time period 704. The parking management system 100 can determine the causal POI 800 when the transaction rate 706 within a certain radius boundary 702 exceeds a rate threshold such as five or ten listings and/or requests per minute. The radius boundary 702 can be established when the parking management system 100 receives the first listing request 304 or reservation request 410.

The causal POI 800 can be a location or venue causing a surge or sudden increase in demand for parking within a vicinity of the causal POI 800. For example, the causal POI 800 can include a sports stadium, a concert hall, a nightclub, a movie theater, a museum, or a restaurant. The causal POI 800 can also include a location of an event such as a site of a farmer's market, a political gathering, or a parade route.

The parking management system 100 can determine the causal POI 800 by calculating a centroid of a polygon created by the positional coordinates of listing requests 304 or reservation requests 410 received within a preset time period 704. For example, three reservation requests 410 can be received within a 60 second period and the parking management system 100 can calculate the centroid of a triangle having vertices at the three desired booking locations 402 included in the three reservation requests 410.

The parking management system 100 can also determine the causal POI 800 using a request trajectory 802. The request trajectory 802 can be the trajectory or direction of travel of a vehicle or other mode of transportation carrying a booking client device 104. In other variations, the request trajectory 802 can be the trajectory or direction of travel of a self-driving vehicle 128 transmitting a reservation request 410.

When the parking management system 100 determines the location of the causal POI 800, the parking management system 100 can send one or more notifications, messages, or alerts to user client devices in the vicinity of the causal POI 800 to alert such users to list their parking spaces using the parking management system 100. The parking management system 100 can send notifications, messages, or alerts to client devices of users who have previously listed their parking spaces using the parking management system 100. The parking management system 100 can also send notifications, messages, or alerts to user client devices along the request trajectory 802 or along a route leading to the causal POI 800.

Figure 9:
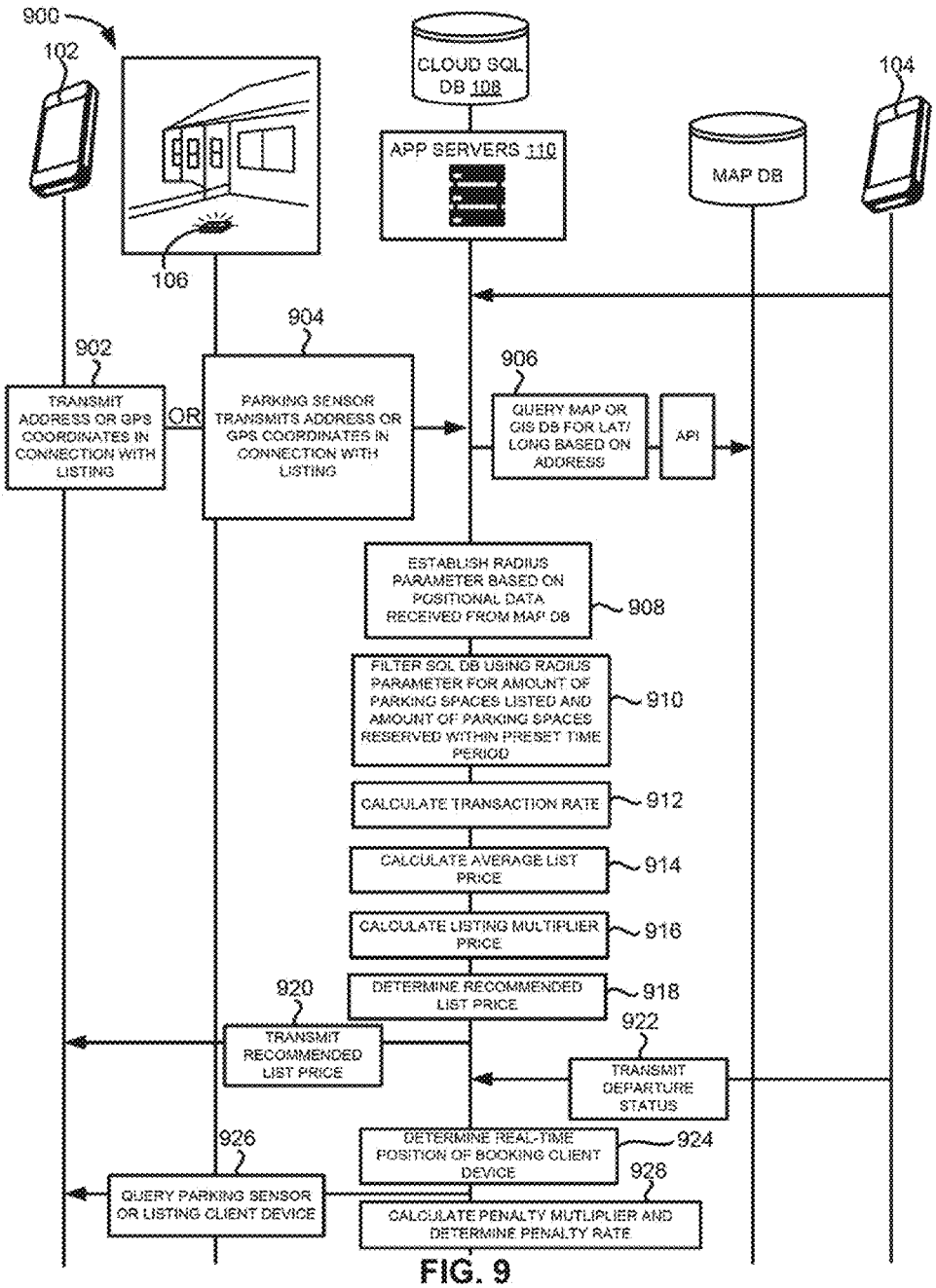
FIG. 9 illustrates a method of operation of the parking management system.

FIG. 9 illustrates that a computer-implemented method 900 of managing parking reservations over the communications network 118 can include receiving, in one or more databases 108 stored in one or more memory units 204, positional data 602 concerning a listing location 310. The positional data 602 or address of the listing location 310 can be transmitted by a listing client device 102 in step 902. The positional data 602 or address of the listing location 310 can also be transmitted by a parking sensor 106 in step 904. When the listing client device 102 or parking sensor 106 transmits an address, the application servers 110 can query a map or GIS database for the positional coordinates of the address in step 906. The application servers 110 can interact with the map or GIS database through a map API such as the Google Maps® API.

The method 900 can also include establishing, using one or more processors 202, a radius boundary 702 based on the positional data 602 stored in the one or more databases 108 in step 908. The method 900 can also include filtering, using the one or more processors 202, the one or more databases 108 using the radius boundary 702 to determine the listing count 616 representing an amount of parking spaces listed and the reservation count 618 representing the amount of parking spaces reserved within a preset time period 704 in step 910.

The method 900 can also include calculating, using the one or more processors 108, a transaction rate 706 using the listing count 616, the reservation count 618, and the preset time period 704 and storing the transaction rate 706 in the one or more databases 108 in step 912. The method 900 can also include calculating an average listing price 718 in step 914. The method 900 can also include calculating a listing multiplier 708 in step 916. The method 900 can include determining, using the one or more processors 108, a recommended listing price 700 based on the average listing price 718 and the listing multiplier 708. The method 900 can include transmitting the recommended listing price 700 to the listing client device 102 over the communications network 118 in step 920.

The method 900 can also include the application servers 110 receiving a status update 420 concerning the departure of a booking vehicle 422 from a reserved parking space 414. For example, a booking client device 104 can transmit the status update 420 in step 922. The method 900 can include determining a real-time position 724 of the booking client device 104 in response to receiving the status update 420 in step 924. The method 900 can also include querying a parking sensor 106 in the vicinity of the reserved parking space 414 in response to the status update to confirm an occupancy status 608 of the reserved parking space 414 in step 926. The method 900 can also include calculating a penalty rate 726 using a penalty multiplier 728 when the system determines the booking vehicle 422 has overstayed the end of the reservation period 418 in step 928.

The system and methods described herein provides an improvement in the way parking data or information is managed and stored in a cloud managed database. In addition, by calculating a recommended listing price 700 based on a transaction rate 706 corresponding to the rate at which parking listings are added and reservation requests are received, the system provides an improvement in the field of parking management beyond recommending prices based on static inventory levels.

A number of variations have been described. Nevertheless, it will be understood by one of ordinary skill in the art that various modifications may be made without departing from the spirit and scope of the variations. In addition, the flowcharts or logic flows depicted in the figures do not require the particular order shown, or sequential order, to achieve desirable results. In addition, other steps or operations may be provided, or steps or operations may be eliminated, from the described flows, and other components may be added to, or removed from, the described systems. Accordingly, other variations are within the scope of the following claims.

It will be understood by one of ordinary skill in the art that the various methods disclosed herein may be embodied in a non-transitory readable medium, machine-readable medium, and/or a machine accessible medium comprising instructions compatible, readable, and/or executable by a processor or processing unit of a machine, device, or computing device. The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

What is claimed is:

1. A system, comprising:
   a non-transitory memory; and
   one or more processors coupled to the non-transitory memory and configured to execute instructions to perform operations comprising:
      receiving, from a first user device, a search request including location data of the first user device and search request parameters;
      filtering, using the one or more processors, in response to the search request, one or more databases to determine listing locations within a reservation region that match the search request parameters, the reservation region being based on the location data;
      providing a notification to respective listing user devices in response to determined parking spaces within the reservation region being below a first threshold;
      automatically selecting a first listing location based on determined listing locations that match the search request parameters, including:
         a proximity to a physical location of the first user device;
         determined occupancy statuses of the listing locations; and
         dimensions associated with the respective listing locations; and
      transmitting instructions to the first user device directing the first user device to the first listing location.

2. The system of claim 1, wherein the operations further comprise:
   determining an occupancy status change of the first listing location; and
   requesting an updated status data set responsive to determining the occupancy status change.

3. The system of claim 1, wherein the operations further comprise:
   obtaining location data sets from a plurality of user devices associated with a group of user devices; and
   determining, based on the location data sets, that the group of user devices are travelling to a destination within a predefined proximity to a second plurality of listing locations.

4. The system of claim 1, wherein the operations further comprise transmitting requests to second user devices to promote second users to list one or more second listing locations as available for occupation.

5. The system of claim 1, wherein the operations further comprise:
   receiving, from a first user device, a departure notification from a first parking location;
   determining, by a first parking sensor, an occupancy status of the first parking location; and
   updating in one or more databases coupled to the one or more processors an amount of available parking spaces.

6. The system of claim 1, wherein the first user device includes a self-driving vehicle and the operations further comprise causing the self-driving vehicle to proceed to the first listing location using the instructions.

7. The system of claim 1, wherein the operations further comprise obtaining, from a plurality of object detection sensors, status data sets associated with the listing locations, the plurality of object detection sensors including one or more sensors selected from a group consisting of an Infra-Red (IR) light transceiver, an IR distance sensor, an ultrasonic detector, and an imaging sensor.

8. The system of claim 1, wherein the operations further comprise activating one or more cameras associated with the first listing location to capture one or more images of the first listing location.

9. The system of claim 1, wherein the operations further comprise:
   determining an event location is associated with a geographical region based on determining a number of search requests for listing locations exceeds a first second threshold; and
   providing a notification to respective listing user devices along a route leading to the event location.

10. The system of claim 1, wherein the operations further comprise:
    obtaining, from a plurality of object detection sensors, status data sets associated with the listing locations, each of the plurality of object detection sensors including a proximity detector, one or more sensor processors, a sensor communication interface, and a portable power supply.

11. A computer-implemented method, the method comprising:

receiving, on a network interface device, a search request including positional data of a first user device and search request parameters;

filtering, using one or more processors, in response to the search request, one or more databases to determine parking spaces within a reservation region that match the search request parameters, the reservation region being based on the positional data;

providing a notification to respective listing user devices in response to determined parking spaces within the reservation region being below a first threshold;

in response to determining parking spaces within the reservation region that match the search request parameters, automatically selecting a first parking space of the determined parking spaces based on:
- a proximity of the first parking space;
- a determined occupancy status of the first parking space; and
- dimensions of the first parking space; and transmitting instructions to the first user device directing the first user device to the first parking space.

12. The computer-implemented method of claim 11, wherein the determined occupancy status of the first parking space is determined by querying a parking sensor in a vicinity of the first parking space.

13. The computer-implemented method of claim 12, further comprising capturing, by a camera unit of the parking sensor, one or more images of a parking space area of the first parking space.

14. The computer-implemented method of claim 12, wherein querying a parking sensor is performed in response to receiving a status update from the first user device.

15. The computer-implemented method of claim 11, further comprising:
determining an event location is associated with a first geographical region based on determining a number of search requests of a plurality of search requests for the plurality of listing locations exceeds a second threshold; and
providing a notification to respective listing user devices along a route leading to the event location.

16. The computer-implemented method of claim 11, further comprising:
calculating a listing multiplier in response to the number of the search requests of the plurality of the search requests for the plurality of listing locations exceeding the first a second threshold; and
providing a second notification including the listing multiplier to the respective listing user devices associated with the plurality of listing locations.

17. The computer-implemented method of claim 11, further comprising:
calculating a penalty multiplier in response to determining a vehicle associated with the first user device has overstayed a reservation period.

18. A non-transitory computer readable medium comprising computer executable instructions stored thereon, which, when executed by one or more processors, cause the one or more processors to perform a method, comprising:
determining an event location based on search requests from a plurality of user devices within a first geographical region exceeding a first threshold number of search requests, the search requests including positional data and search request parameters;
receiving, on a network interface device, route information from a first user device including destination coordinates;
determining the destination coordinates are within the first geographical region;
receiving a first search request from the first user device including positional data of the first user device and first search request parameters;
identifying a location of the first user device based on the positional data;
automatically selecting a first parking space within the first geographical region based on the search request parameters; and
transmitting instructions causing the first user device to be directed to the first user device to the first parking space.

19. The non-transitory computer readable medium of claim 18, wherein the method further comprises
providing a notification to respective listing user devices along a route leading to the event location.

20. The non-transitory computer readable medium of claim 18, wherein the method further comprises obtaining, from a plurality of object detection sensors, status data sets associated with a plurality of listing locations, the status data sets being automatically generated by the plurality of object detection sensors based on one or more determinations that an object optically or acoustically obstructs one or more object detection sensors.

* * * * *